United States Patent [19]

Kandarian

[11] Patent Number: 4,538,385
[45] Date of Patent: Sep. 3, 1985

[54] PROTECTIVE COVER FOR COTTON MODULE

[76] Inventor: Ernest Kandarian, 1846 Mitchell, Clovis, Calif. 93612

[21] Appl. No.: 496,885

[22] Filed: May 23, 1983

[51] Int. Cl.³ .............................................. B62D 63/04
[52] U.S. Cl. ......................................... 52/3; 206/83.5
[58] Field of Search ...................... 52/3, 4, 5; 206/83.5

[56] References Cited

U.S. PATENT DOCUMENTS

| 2,127,118 | 8/1938 | Herbelin | 206/83.5 |
| 4,071,138 | 1/1978 | Wright | 206/83.5 |
| 4,221,085 | 9/1980 | Conaghan | 52/4 |

FOREIGN PATENT DOCUMENTS

| 444931 | 5/1927 | Fed. Rep. of Germany | 52/3 |
| 1366076 | 9/1974 | United Kingdom | 52/3 |
| 2026056 | 1/1980 | United Kingdom | 52/3 |

Primary Examiner—John E. Murtagh
Assistant Examiner—Kathryn Ford
Attorney, Agent, or Firm—Dennis B. Haase

[57] ABSTRACT

The present invention contemplates a protective cover for a cotton module comprising, in its preferred form, a cap portion adapted to fit about the top of the module, a skirt portion connected to and depending from said cap portion and adapted to encircle the midportion of the module in holding relation and means secured about the perimeter of said skirt for securing the skirt and thus the protective cover about said module to protect the same against wind, rain and other environmental elements.

9 Claims, 3 Drawing Figures

U.S. Patent    Sep. 3, 1985    4,538,385
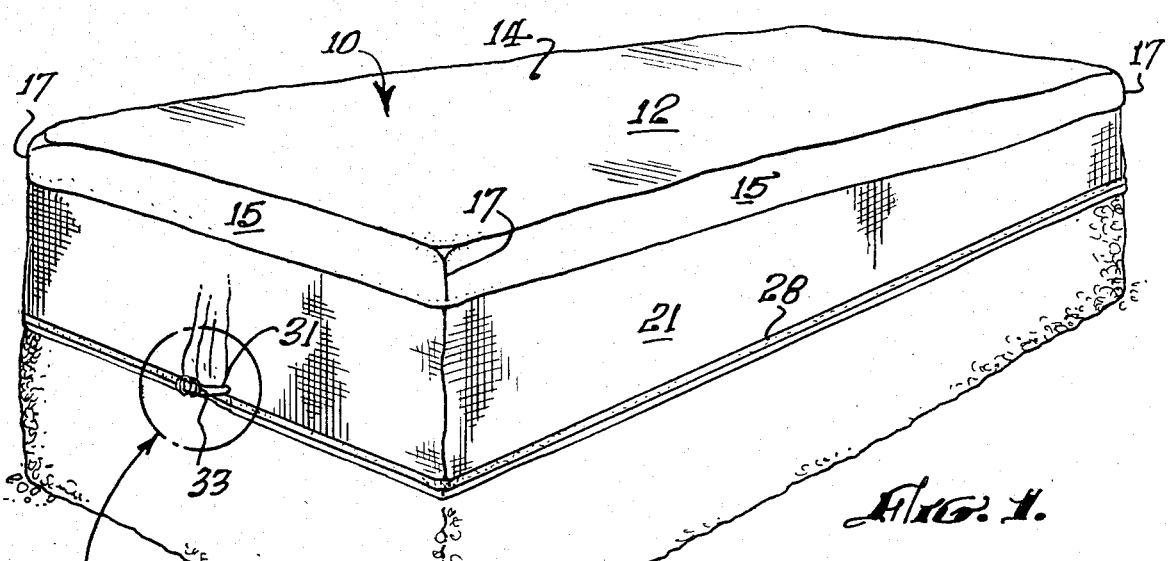
FIG. 1.
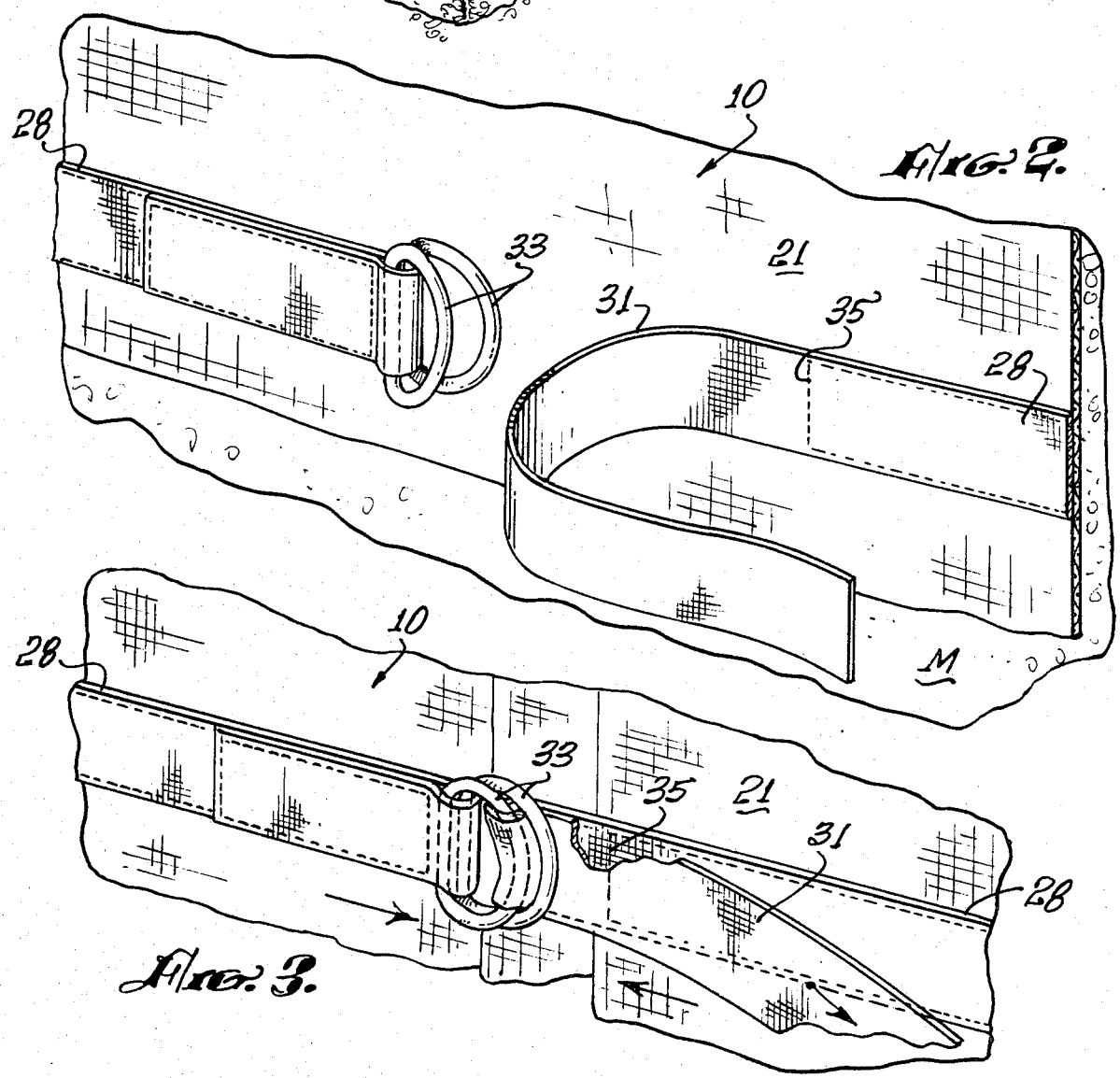
FIG. 2.
FIG. 3.

PROTECTIVE COVER FOR COTTON MODULE

BACKGROUND OF THE INVENTION

1. Field of the Invention

The protective cover of the present invention addresses a significant problem indigenous to the agricultural community generally, with particular impact in areas of high cotton production, among them central California and Texas.

There is typically a window of time within which cotton must be harvested in order to insure the highest possible quality. That window is governed by several variables, among them planting time, weather conditions during the growth period and certainly, weather conditions at or about maturity. Certainly, in the San Joaquin Valley of California, and to a greater or lesser extent in other cotton production areas of the country, cotton is often mature with bolls open and ready for picking at or very near the time when the fall rains are anticipated. If rain is experienced with cotton in the bolls it may be beaten down, splashed with dirt and it becomes much harder to pick. The quality of cotton is diminished and much of it is left on the ground. As an aside, but of significance to the cotton grower, is the availability of equipment at or about the time the farmer is ready to pick. Due to the expense of equipment, many farmers engage the services of custom pickers and must schedule the equipment as available. If rain or other weather conditions intercede which would make the fields soggy and unable to support heavy equipment, or would otherwise diminish the quality of the cotton plants, the farmer will invariably experience significant financial loss.

The harvest is but one of the problems facing the farmer and not unlike the custom and practice of hiring custom havesters to pick the cotton, the farmer typically has to schedule the ginning of his cotton with available ginning facilities. Since cotton ginning facilities are relatively expensive to construct and are used only once during the year, it is commonplace, particularly in high cotton production areas, for the farmer to pick within the time window and thereafter to cause his cotton harvest to be stored in fields until he can schedule time at a gin.

Until relatively recent times, the storage of cotton was accomplished simply by dumping it in mounds on the ground, but moisture and dirt diminished quality and tended to scatter the loosely piled cotton. With the advent of the module builder, however, farmers were able to store the cotton on large pallets or on some other form of moisture barrier, in modules of compressed cotton permitting greater efficiency in the use of space. Although a cotton module may differ in size somewhat, a typical module is 32 feet long by 8 feet wide and 7 feet high. There are some module builders which will construct a module 36 feet long and the dimensions are provided here for the general purpose of permitting a clear visualization of the invention and the problem which it solves.

Even in compressed modules, the cotton is at the mercy of the environment, and since modules may remain in the open in fields for two to four months, a very significant diminution of quality might be expected over that period of time if proper protection is not afforded each module. Since the cotton market is very quality sensitive, any diminution in quality translates into significant financial losses to the farmer.

Brief Analysis of the Prior Art

The need to protect modules from the elements was readily recognized, and after formation of a module the farmer typically threw a tarpaulin over the module and would secure the tarp with ropes tied to spikes, akin to tent poles, about the base thereof. It was found, however, that both ropes and spikes found their way into the ginning equipment with disastrous consequences to the machinery. With the advent of facilities for the manufacture of very large plastic sheets, several farmers purchased such sheets and would hold them down with old rubber tires or other holding devices. In both instances, problems arose because both personnel and equipment might well run afoul of the tiedowns about the module. Another problem resulted from the inadequate circulation of air, or by virtue of the failure of one or more of the hold-down devices in a strong wind which literally lifted such covers. The result was degradation of the module and eventually the quality of the cotton contained therein. It was recently suggested by Henslee, et al. in a 1981 Pat. No. 4,257,200, that long, sharp pins could be inserted into the module itself to hold down a tarpaulin disposed over the top of the module. This approach, however, required a large number of pins, grommets above the periphery of the tarp and complications and difficulties in removing and storing the pins, not the least of which was a danger to those than handled them. Not unlike previous concepts, the pins of Henslee might well be left in a module, and end up damaging the ginning equipment.

As will become apparent from a studying of the following detailed description of the preferred embodiment of the invention, the problems attendant the preservation of cotton modules in the field are substantially eliminated and the manner in which said problems are eliminated will become clear when the following specification is read in conjunction with the drawings wherein:

FIG. 1 is a perspective of a cotton module of typical dimension, having a protective cover constructed in accordance with the present invention in place; and FIGS. 2 and 3 illustrate means for securing the protective cover about the module when in use, all in accordance with the present invention.

With reference now to the drawings, and with particular, although not exclusive reference to FIG. 1, a cotton module of typical configuration is illustrated at M. In order to protect the module M while stored in the field, there is provided, in accordance with the present invention, a protective cover indicated generally at 10. The protective cover, in accordance with the present invention, includes a cap 12 formed of water repellent material such as polyethylene plastic, although other water repellent materials will suffice. The cap includes a flat top portion 14 of a width and length sufficient to fully cover the top of the module. The flat top 14 is fitted with appendages 15 depending therefrom and corners are fitted as at 17 in such a manner that the cap will fit over and cover the top of the module M. It will be understood that the appendages may be integrally formed with the top 14 or separately formed and attached without departure from the invention.

It is desirable that the protective cover encircle the module over a significant portion of its height, while at the same time permitting air to reach the module so that the module may breathe, thereby minimizing moisture buildup with attendant problems of spontaneous combustion or seed germination. This is accomplished in accordance with the present invention by the provision of a skirt 21 depending from the appendages 15 to which the skirt is engaged by stitching or some other suitable means. In order to permit breathing, the skirt is formed of a loosely woven mesh material such as a netting sufficient to permit substantial contact between ambient air and the surface of the module covered by the skirt.

While as may be seen in FIG. 1 the protective cover, is, in accordance with the invention, dimensioned to fit the module M, experience has demonstrated that winds in an open field blowing across the top portion 12 tend to cause a negative pressure over the surface of the top 12, causing it to lift. Such lifting action could, over a period of time, cause the protective cover to be completely removed and in the process dislodge substantial amounts of compressed cotton comprising the module. It is recognized that means must be provided to secure the protective cover in place on the module without damage to the module's integrity.

The present invention meets this requirement in the novel manner not previously contemplated. Accordingly, and with reference primarily to FIGS. 2 and 3, means for holding the protective cover in secure relation about the surface of the module is provided in the form of one or more belts 25 which traverse the perimeter of the peripheral edge of the skirt 21 where they are secured such as by being stitched directly to the hem 28 of the skirt 21, or by any other suitable means.

Further, in accordance with the invention, each belt includes means for cinching the same. In the preferred embodiment, cinching means is provided at opposite ends of the module midway along its minor dimension or width. It will be appreciated that the number and location of cinches may vary. Accordingly, cinching means 30, including a tongue 31 is provided for interconnection with D-rings shown at 33. The tongue 31 is secured to the skirt at a point 35 and is adapted to slip through the D-rings in a known manner and cinch the belt about the waist of the module M as shown in FIG. 3, thereby permitting the belt to be drawn tightly about the waist of the module to secure the same in place without the use of tie-downs or piercing the module itself.

Having thus described the preferred embodiment of the invention, what is claimed is:

1. A protective cover for a cotton module formed of a relatively large volume of cotton compressed into a generally parallelepiped configuration comprising:
   a water repellent cap portion adapted to fit about the top of the module and extending downwardly therefrom;
   means defining a skirt portion connected to and depending from said cap portion and adapted to encircle the mid-portion of the module, said skirt portion comprising an air permeable mesh to provide substantially unobstructed air flow from the ambient air into the module;
   and belt means including means for cinching fastened about the perimeter of said skirt portion for securing said cover about the module without intrusion into the module surface.

2. The protective cover of claim 1 wherein said belt means comprises belts extending about the perimeter of said skirt portion and said means for cinching holds said belts together in secure relation about said module.

3. The protective cover of claim 2 wherein said means for cinching comprises a tongue and D-rings fastened to said belts, said tongue being secured by said D-rings to draw said belts firmly about said module.

4. The protective cover of claim 2 wherein said means for cinching are provided at opposed ends of the module.

5. The protective cover of claim 1 wherein said belts are fastened to the perimeter of said skirt portion along the entire length of said belts.

6. A protective cover secured to a cotton module formed of a relatively large volume of cotton compressed into a generally parallelepiped configuration comprising:
   a water repellent cap portion adapted to fit about the top of the module and extend downwardly therefrom;
   means defining a skirt portion connected to and depending from said cap portion and adapted to encircle the mid-portion of the module, said skirt portion comprising an air permeable mesh to provide substantially unobstructed air flow from the ambient air into the module;
   and belt means, including means for cinching, fastened about the perimeter of said skirt portion for securing said cover about the module without intrusion into the module surface.

7. The protective cover of claim 6, wherein said belt means comprises belts extending about the perimeter of said skirt portion and said means for cinching holds said belts together in secure relation about said module.

8. The protective cover of claim 7, wherein said means for cinching comprises a tongue and D-rings fastened to said belts, said tongue being secured by said D-rings to draw said belts firmly about said module.

9. The protective cover of claim 7, wherein said means for cinching are provided at opposed ends of the module.

* * * * *